United States Patent [19]

Toma et al.

[11] Patent Number: 4,511,632
[45] Date of Patent: Apr. 16, 1985

[54] ALUMINUM ALLOY CLAD SHEET HAVING EXCELLENT HIGH-TEMPERATURE SAGGING RESISTANCE AND THERMAL CONDUCTIVITY

[75] Inventors: Ken Toma, Susono; Masanao Iida, Numazu; Yo Takeuchi, Susono, all of Japan

[73] Assignee: Mitsubishi Aluminum Kabushiki Kaisha, Tokyo, Japan

[21] Appl. No.: 399,737

[22] Filed: Jul. 19, 1982

[51] Int. Cl.$^3$ ............................................. B32B 15/20
[52] U.S. Cl. .................................. 428/654; 420/535; 420/537; 420/544; 420/548
[58] Field of Search ............... 420/535, 544, 545, 548, 420/537; 148/437, 438, 439, 440; 428/654

[56] References Cited

U.S. PATENT DOCUMENTS 4,072,542  2/1978  Murakado et al. ................. 148/437

*Primary Examiner*—R. Dean
*Attorney, Agent, or Firm*—Frishauf, Holtz, Goodman & Woodward

[57] ABSTRACT

A clad sheet comprising an aluminum alloy sheet having excellent high-temperature sagging resistance and thermal conductivity comprising an aluminum alloy sheet clad on at least one surface with a brazing metal, said aluminum alloy sheet consists essentially of:
  manganese: from 0.1 to 0.5 wt. %,
  silicon: from 0.1 to 0.8 wt. %,
  zirconium: from 0.02 to 0.2 wt. %,
and, the balance being aluminum and incidental impurities.

The clad sheet is particularly adapted to be used as a fin material for tubes of a heat exchanger, said aluminum alloy sheet may also contain chromium within the range of from 0.05 to 0.4 wt. % and/or at least one element selected from the group consisting of:
  magnesium: from 0.1 to 0.7 wt. %, and,
  copper: from 0.1 to 0.7 wt. %,
total amount of said magnesium and said copper being up to 1.0 wt. %.

8 Claims, No Drawings

ALUMINUM ALLOY CLAD SHEET HAVING EXCELLENT HIGH-TEMPERATURE SAGGING RESISTANCE AND THERMAL CONDUCTIVITY

FIELD OF THE INVENTION

The present invention relates to a clad aluminum alloy excellent in high-temperature sagging resistance and thermal conductivity, particularly adapted to be used as a fin material for tubes of such heat exchangers as radiators, condensers and evaporators.

BACKGROUND OF THE INVENTION

A plurality of fins comprising thin sheets are provided on outer surfaces of tubes which are members constituting a heat exchanger such as a radiator for a motorcycle or an automobile, a condenser for a cooler, or an evaporator, in order to increase the radiating surface area of the tube. An aluminum alloy is used in many cases as the material for the aforementioned tubes, and in such a case, it is the usual practice to use, as the fin material, thin sheets of an aluminum alloy, or clad sheets manufactured by applying a brazing metal film to one or both sides of these sheets as core materials.

Various methods are available for installing fins of any of the aforementioned materials on the outer surface of a tube made of an aluminum alloy. Among such various methods, the vacuum brazing method for brazing many joints at a time is widely adopted in the industry, which comprises: provisionally tacking a plurality of fins substantially vertically at prescribed intervals onto the outer surface of a tube by the use of an appropriate jig to form an assembly, at least one of the outer surface of said tube and the both surfaces or one surface of said fin being previously applied with a brazing metal film; heating said assembly to a temperature of from about 580° to about 620° C. in a vacuum furnace to melt said brazing metal film, thereby brazing said plurality of fins to the outer surface of said tube with said melted brazing metal at a time by a single heating.

When installing fins onto the outer surface of a tube by the aforementioned method, heating causes a change in the structure of fin comprising aluminum alloy sheets or clad sheets, leading to finer recrystallization grains, and when the fins comprise clad sheets, the above-mentioned heating causes penetration of the melted brazing metal between fine recrystallization grains, resulting in a decrease in the high-temperature strength of the fins; the fins sag down and deform as a result and cannot hold their original shape upon forming the assembly.

To overcome the above-mentioned problems, an Al—Mn alloy or an Al—Mn—Zr alloy has so far been employed as the material for aluminum alloy sheets constituting fins. Manganese contained in the Al—Mn alloy and zirconium contained in the Al—Mn—Zr alloy prevent recrystallization grains from becoming finer during heating, and in the case of fins comprising clad sheets, the aforementioned prevention of recrystallization grains from becoming finer makes it difficult for the melted brazing metal to penetrate between recrystallization grains, thus providing the effect of increasing high-temperature strength of the fins.

However, high-temperature strength of the fins is still insufficient even with the above-mentioned Al—Mn alloy or Al—Mn—Zr alloy. Particularly, as a result of the recent tendency toward decreasing the thickness of fins to reduce the weight of a heat exchanger, it is difficult to prevent fins from sagging down and deforming under the effect of the aforementioned heating for brazing.

With this fact in view, there has been proposed an aluminum alloy excellent in high-temperature sagging resistance, adapted to be used as a fin material for tubes of a heat exchanger, as disclosed in Japanese Patent Publication No. 9,617/82 dated Feb. 22, 1982, which comprises:

manganese: from 0.6 to 1.5 wt.%,
magnesium: from 0.3 to 0.9 wt.%,
silicon: from 0.05 to 0.25 wt.%,
at least one element selected from the group consisting of:
zirconium: from 0.05 to 0.25 wt.%, and
vanadium: from 0.01 to 0.1 wt.%,
and, the balance being aluminum and incidental impurities (hereinafter referred to as the "prior art").

In the above-mentioned prior art, however, manganese contained in an amount of at least 0.6 wt.% in the aluminum alloy leads to the presence of a large amount of manganese dissolved in aluminum, and the resultant decreased thermal conductivity causes deterioration of heat exchange property as a fin material for a heat exchanger. In the prior art, furthermore, when the disclosed aluminum alloy is used as a fin material for tubes of a heat exchanger, the high manganese content in the aluminum alloy makes the fin electric potential noble, resulting in acceleration of corrosion of the tube, although the fins must play the role of a sacrificial anode to cathodically protect the tube from corrosion.

SUMMARY OF THE INVENTION

An object of the present invention is therefore to provide an aluminum alloy adapted to be used as a fin material for tubes which are component members of a heat exchanger such as a radiator, a condenser or an evaporator.

A principal object of the present invention is to provide an aluminum alloy adapted to be used as a fin material for tubes of a heat exchanger, which is excellent in high-temperature sagging resistance sufficient for preventing the fins from sagging down and deforming under the effect of high temperatures in the vacuum furnace when brazing a plurality of fins at a time on the outer surface of said tubes by the vacuum brazing method, and excellent in thermal conductivity as well.

In accordance with one of the features of the present invention, there is provided a clad sheet comprising a brazing metal film clad on an aluminum alloy sheet excellent in high-temperature sagging resistance and thermal conductivity, which consists essentially of:

manganese: from 0.1 to 0.5 wt.%,
silicon: from 0.1 to 0.8 wt.%,
zirconium: from 0.02 to 0.2 wt.%,
and, the balance being aluminum and incidental impurities.

Said aluminum alloy sheet may also contain chromium within the range of from 0.05 to 0.4 wt.% and/or at least one element selected from the group consisting of:

magnesium: from 0.1 to 0.7 wt.%, and,
copper: from 0.1 to 0.7 wt.%,
the total amount of said magnesium and said copper being limited up to 1.0 wt.%.

DETAILED DESCRIPTION OF PREFERRED EMBODIMENTS

From the aforementioned point of view, we have carried out intensive studies to obtain an aluminum alloy particularly adapted to be used as a fin material for tubes made of an aluminum alloy which are component members of a heat exchanger such as a radiator, a condenser or an evaporator. As a result, we obtained the following findings:

(1) An Al—Mn—Zr alloy containing manganese within the range of from 0.1 to 0.5 wt.% and zirconium within the range of from 0.02 to 0.2 wt.% forms, when additionally containing silicon within the range of from 0.1 to 0.8 wt.%, an Al—Mn—Si compound through combination of silicon with manganese as well as an Al—Zr—Si compound through combination of silicon with zirconium.

(2) Both the Al—Mn—Si compound and the Al—Zr—Si compound, being compounds very stable at high temperatures, strongly prevent recrystallization grains from becoming finer, making recrystallization grains coarser, and thus improve high-temperature sagging resistance of an aluminum alloy.

(3) An Al—Mn—Si compound containing a manganese within the range of from 0.1 to 0.5 wt.%, which has a very slight content of manganese dissolved in aluminum, prevents decreases in thermal conductivity of an aluminum alloy caused by containing manganese.

(4) When an Al—Mn—Zr alloy further contains chromium within the range of from 0.05 to 0.4 wt.% in addition to silicon, an Al—Cr compound is formed, and the coexistence of the Al—Cr compound, the Al—Mn—Si compound and the Al—Zr—Si compound further improves high-temperature sagging resistance of the aluminum alloy.

(5) When the Al—Mn—Zr alloy further contains at least one of manganese within the range of from 0.1 to 0.7 wt.% and copper within the range of from 0.1 to 0.7 wt.% in addition to silicon, the strength of the aluminum alloy is further improved.

The present invention was developed on the basis of the above-mentioned findings, and the aluminum alloy of the present invention consists essentially of:

manganese: from 0.1 to 0.5 wt.%,
silicon: from 0.1 to 0.8 wt.%,
zirconium: from 0.02 to 0.2 wt.%, and, the balance being aluminum and incidental impurities;

said aluminum alloy including an aluminum alloy further additionally containing chromium within the range of from 0.05 to 0.4 wt.% and/or at least one element selected from the group consisting of:

magnesium: from 0.1 to 0.7 wt.%, and,
copper: from 0.1 to 0.7 wt.%, the total amount of said magnesium and said copper being limited up to 1.0 wt.%.

Now, the reasons for limiting the ranges of the chemical compositions of the aluminum alloy of the present invention are given below:

(1) Manganese:

Manganese has a function of improving high-temperature sagging resistance of fins made of an aluminum alloy by forming an Al—Mn—Si compound under the coexistence with silicon described later and by recrystallization grains of the fins made of the aluminum alloy becoming coarser under the effect of this Al—Mn—Si compound. The fins made of the aluminum alloy are in general problematic in that a melted brazing metal penetrates between recrystallization grains of the fin structure, resulting in a decreased high-temperature sagging resistance. However, manganese makes it difficult for a melted brazing metal to penetrate between recrystallization grains under the effect of the recrystallization grains of the fins becoming coarser by the above-mentioned Al—Mn—Si compound, thus preventing high-temperature sagging resistance of the fins from decreasing.

However, a manganese content of under 0.1 wt.% cannot ensure a desired effect as mentioned above. On the other hand, a manganese content of over 0.5 wt.% cannot give a particular increase in the aforementioned effect, but a manganese content of over 0.5 wt.% may even cause deterioration of the aforementioned effect. With a manganese content of over 0.5 wt.%, furthermore, there is a considerable increase in the content of manganese dissolved in aluminum, leading to a decreased thermal conductivity of fins made of the aluminum alloy. This results in a deteriorated heat exchange property when used as a fin material for tubes of a heat exchanger. In addition, when used as a fin material for tubes of a heat exchanger, with a manganese content of over 0.5 wt.%, the electric potential of the fins becoming noble causes acceleration of corrosion of the tubes. The manganese content should therefore be limited within the range of from 0.1 to 0.5 wt.%.

(2) Silicon:

Silicon has a function of improving high-temperature sagging resistance of fins made of an aluminum alloy under the effect of an Al—Mn—Si compound produced under the coexistence with the above-mentioned manganese and an Al—Zr—Si compound produced under the coexistence with zirconium described later.

However, a silicon content of under 0.1 wt.% cannot ensure a desired effect as mentioned above. On the other hand, a silicon content of over 0.8 wt.% cannot give a particular increase in the aforementioned effect, but a silicon content of over 0.8 wt.% may even cause deterioration of the aforementioned effect. The silicon content should therefore be limited within the range of from 0.1 to 0.8 wt.%.

(3) Zirconium:

Zirconium has a function, through the coexistence of an Al—Zr—Si compound produced under the coexistence with silicon and the Al—Mn—Si compound mentioned above, of further improving high-temperature sagging resistance of fins made of an aluminum alloy brought about by the Al—Mn—Si compound mentioned above.

However, a zirconium content of under 0.02 wt.% cannot ensure a desired effect as mentioned above. On the other hand, a zirconium content of over 0.2 wt.% cannot give a particular increase in the aforementioned effect, but a zirconium content of over 0.2 wt.% may even cause deterioration of workability, when manufacturing fins, through easier production of very large crystals of Al—Zr—Si compound during casting. The zirconium content should therefore be limited within the range of from 0.02 to 0.2 wt.%.

(4) Chromium:

Chromium has a function of forming an Al—Cr compound and synergistically improving high-temperature sagging resistance of fins made of an aluminum alloy through the coexistence of this Al—Cr compound, said Al—Mn—Si compound and said Al—Zr—Si compound. Chromium is therefore added as required to the aluminum alloy of the present invention.

However, a chromium content of under 0.05 wt.% cannot ensure a desired effect as mentioned above. On the other hand, a chromium content of over 0.4 wt.% cannot give a particular increase in the aforementioned effect, but a chromium content of over 0.4 wt.% may even cause deterioration of workability, when manufacturing fins, through easier production of very large crystals of Al—Cr compound. The chromium content should therefore be limited within the range of from 0.05 to 0.4 wt.%.

(5) Magnesium and copper:

Magnesium and copper have a function of improving the strength of fins made of an aluminum alloy through dissolution into the aluminum alloy matrix. Furthermore, when manufacturing fins made of an aluminum alloy through cold rolling, magnesium and copper have a function of considerably increasing the strength of the fins made of the aluminum alloy with a slight reduction ratio. At least one of magnesium and copper is therefore additionally added as required to the aluminum alloy of the present invention.

However, a magnesium content and a copper content both of under 0.1 wt.% cannot ensure a desired effect as mentioned above. On the other hand, when both the magnesium content and the copper content individually exceed 0.7 wt.%, or when the total content of magnesium and copper exceeds 1.0 wt.%, the effect of the above-mentioned Al—Mn—Si compound and Al—Zr—Si compound of making recrystallization grains coarser is impaired, thus resulting in a deteriorated high-temperature sagging resistance and in a decreased thermal conductivity of fins made of an aluminum alloy. The content of magnesium and copper should therefore be limited within the range of from 0.1 to 0.7 wt.% when any one of magnesium and copper is singly contained, and when both magnesium and copper are contained, the total amount of magnesium and copper should be limited up to 1.0 wt.%.

Now, the aluminum alloy of the present invention is described in more detail with reference to an example and in comparison with conventional alloys and reference alloys.

EXAMPLE

Cast ingots Nos. 1 through 12 of the aluminum alloys of the present invention (hereinafter referred to as the "alloys of the present invention"), cast ingots Nos. 1 through 3 of the conventional aluminum alloys (hereinafter referred to as the "conventional alloys"), and cast ingots Nos. 1 through 8 of aluminum alloys in which the content of at least one constituent element is outside the scope of the present invention (hereinafter referred to as the "reference alloys") were prepared by the conventional melting and casting method. The chemical compositions of the above-mentioned alloys of the present invention are shown in Table 1, and those of the conventional alloys and the reference alloys, in Table 2. Although not shown in Tables 1 and 2, all these alloys contain as incidental impurities Fe of up to 0.5 wt.% and Zn of up to 0.02 wt.%. The aluminum alloys not intentionally containing chromium, magnesium and copper contain, as incidental impurities, chromium of up to 0.01 wt.%, magnesium of up to 0.01 wt.% and copper of up to 0.05 wt.%.

TABLE 1

| Alloy No. | Chemical composition (wt. %) | | | | | | | Cold rolling reduction ratio (%) | Sheet | | | Clad Sheet | |
| | Mn | Si | Zr | Cr | Mg | Cu | Al | | Sag value (mm) | Tensile strength (kg/mm²) | Electric conductivity (% IACS) | Sag value (mm) | Tensile strength (kg/mm²) |
| --- | --- | --- | --- | --- | --- | --- | --- | --- | --- | --- | --- | --- | --- |
| | | | | | | | Alloys of the present invention | | | | | | |
| 1 | 0.15 | 0.25 | 0.18 | — | — | — | Bal. | 0 | 0.2 | 10.1 | — | 0.4 | 10.0 |
| | | | | | | | | 30 | 0.1 | 12.8 | 53.5 | 0.3 | 12.7 |
| | | | | | | | | 50 | 0.4 | 14.5 | — | 3.5 | 14.3 |
| 2 | 0.25 | 0.26 | 0.10 | — | — | — | Bal. | 0 | 0.2 | 10.2 | — | 1.3 | 12.9 |
| | | | | | | | | 30 | 0.1 | 13.0 | 52.3 | 1.9 | 12.9 |
| | | | | | | | | 50 | 0.4 | 14.7 | — | 3.1 | 14.7 |
| 3 | 0.24 | 0.24 | 0.18 | — | — | — | Bal. | 0 | 0.2 | 13.0 | 51.2 | 1.5 | 12.8 |
| | | | | | | | | 30 | 0.1 | 13.0 | 51.2 | 1.5 | 14.5 |
| | | | | | | | | 50 | 0.4 | 14.5 | — | 3.3 | 14.5 |
| 4 | 0.48 | 0.57 | 0.05 | — | — | — | Bal. | 0 | 0.2 | 12.5 | — | 0.3 | 12.2 |
| | | | | | | | | 30 | 0.3 | 15.0 | 49.8 | 0.4 | 15.1 |
| | | | | | | | | 50 | 0.5 | 16.3 | — | 4.1 | 16.2 |
| 5 | 0.24 | 0.25 | 0.18 | 0.12 | — | — | Bal. | 0 | 0.1 | 12.5 | — | 0.2 | 14.7 |
| | | | | | | | | 30 | 0.1 | 14.6 | 48.9 | 0.2 | 14.7 |
| | | | | | | | | 50 | 0.3 | 16.6 | — | 5.1 | 16.5 |
| 6 | 0.50 | 0.52 | 0.17 | 0.25 | — | — | Bal. | 0 | 0.1 | 12.7 | — | 0.1 | 12.6 |
| | | | | | | | | 30 | 0.1 | 14.8 | 46.5 | 0.3 | 14.5 |
| | | | | | | | | 50 | 0.3 | 16.7 | — | 5.8 | 16.8 |
| 7 | 0.30 | 0.31 | 0.13 | — | 0.25 | — | Bal. | 0 | 0.2 | 11.0 | — | 1.5 | 11.1 |
| | | | | | | | | 30 | 0.3 | 15.1 | 50.1 | 1.5 | 15.3 |
| | | | | | | | | 50 | 0.4 | 18.0 | — | 4.3 | 18.6 |
| 8 | 0.32 | 0.43 | 0.18 | — | 0.66 | — | Bal. | 0 | 0.2 | 14.5 | — | 0.8 | 14.6 |
| | | | | | | | | 30 | 0.1 | 19.3 | 48.6 | 0.8 | 19.4 |
| | | | | | | | | 50 | 0.3 | 20.5 | — | 5.8 | 20.3 |
| 9 | 0.31 | 0.33 | 0.10 | — | — | 0.21 | Bal. | 0 | 0.2 | 11.1 | — | 1.7 | 11.0 |
| | | | | | | | | 30 | 0.2 | 14.9 | 50.3 | 1.5 | 14.8 |
| | | | | | | | | 50 | 0.3 | 17.8 | — | 5.2 | 18.5 |
| 10 | 0.35 | 0.36 | 0.15 | — | — | 0.65 | Bal. | 0 | 0.3 | 14.5 | — | 0.7 | 14.4 |
| | | | | | | | | 30 | 0.4 | 16.9 | 46.5 | 0.7 | 16.8 |
| | | | | | | | | 50 | 0.6 | 21.0 | — | 5.5 | 21.1 |
| 11 | 0.37 | 0.39 | 0.17 | — | 0.16 | 0.50 | Bal. | 0 | 0.2 | 14.7 | — | 0.5 | 14.8 |
| | | | | | | | | 30 | 0.2 | 17.1 | 46.7 | 0.4 | 17.2 |
| | | | | | | | | 50 | 0.4 | 21.3 | — | 5.0 | 21.0 |

TABLE 1-continued

| Alloy No. | Chemical composition (wt. %) | | | | | | | Cold rolling reduction ratio (%) | Sheet | | | Clad Sheet | |
|---|---|---|---|---|---|---|---|---|---|---|---|---|---|
| | Mn | Si | Zr | Cr | Mg | Cu | Al | | Sag value (mm) | Tensile strength (kg/mm$^2$) | Electric conductivity (% IACS) | Sag value (mm) | Tensile strength (kg/mm$^2$) |
| 12 | 0.31 | 0.30 | 0.13 | 0.15 | 0.25 | 0.15 | Bal. | 0 | 0.2 | 12.5 | — | 0.7 | 12.3 |
| | | | | | | | | 30 | 0.3 | 16.6 | 48.1 | 0.3 | 16.7 |
| | | | | | | | | 50 | 0.3 | 19.5 | — | 3.0 | 19.7 |

TABLE 2

| Alloy No. | Chemical composition (wt. %) | | | | | | | Cold rolling reduction ratio (%) | Sheet | | | Clad Sheet | |
|---|---|---|---|---|---|---|---|---|---|---|---|---|---|
| | Mn | Si | Zr | Cr | Mg | Cu | Al | | Sag value (mm) | Tensile strength (kg/mm$^2$) | Electric conductivity (% IACS) | Sag value (mm) | Tensile strength (kg/mm$^2$) |
| *Conventional alloys* | | | | | | | | | | | | | |
| 1 | 1.05 | 0.10 | — | — | — | — | Bal. | 0 | 10.5 | 11.0 | — | 25.0 | 10.9 |
| | | | | | | | | 30 | 8.3 | 15.0 | 42.8 | 18.1 | 14.7 |
| | | | | | | | | 50 | 10.1 | 17.1 | — | 25.0 | 16.9 |
| 2 | 1.15 | 0.11 | 0.15 | — | — | — | Bal. | 0 | 7.5 | 11.3 | — | 10.1 | 11.0 |
| | | | | | | | | 30 | 6.8 | 15.4 | 42.0 | 12.0 | 15.5 |
| | | | | | | | | 50 | 9.5 | 17.5 | — | 13.0 | 17.8 |
| 3 | 1.11 | 0.65 | 0.12 | — | 0.86 | — | Bal. | 0 | 10.5 | 14.8 | — | 11.5 | 14.7 |
| | | | | | | | | 30 | 8.3 | 17.8 | 39.5 | 9.7 | 17.5 |
| | | | | | | | | 50 | 12.8 | 21.5 | — | 19.5 | 21.3 |
| *Reference alloys* | | | | | | | | | | | | | |
| 1 | 0.03 | 0.39 | 0.13 | — | — | — | Bal. | 0 | 8.1 | 6.5 | — | 12.5 | 6.6 |
| | | | | | | | | 30 | 8.5 | 7.8 | 53.3 | 7.5 | 7.7 |
| | | | | | | | | 50 | 9.8 | 9.9 | — | 19.5 | 9.8 |
| 2 | 0.65 | 0.41 | 0.12 | — | — | — | Bal. | 0 | 3.5 | 10.1 | — | 5.3 | 10.0 |
| | | | | | | | | 30 | 2.5 | 12.5 | 43.1 | 5.7 | 12.4 |
| | | | | | | | | 50 | 5.8 | 14.8 | — | 15.8 | 14.7 |
| 3 | 0.36 | 0.91 | 0.10 | — | — | — | Bal. | 0 | 5.1 | 9.6 | — | 7.5 | 9.7 |
| | | | | | | | | 30 | 3.4 | 10.5 | 47.9 | 5.7 | 10.4 |
| | | | | | | | | 50 | 9.7 | 11.8 | — | 13.4 | 11.7 |
| 4 | 0.34 | 0.38 | 0.01 | — | — | — | Bal. | 0 | 10.1 | 9.1 | — | 15.0 | 9.0 |
| | | | | | | | | 30 | 5.5 | 10.3 | 49.8 | 9.8 | 10.2 |
| | | | | | | | | 50 | 12.5 | 11.5 | — | 19.7 | 11.4 |
| 5 | 0.31 | 0.35 | 0.12 | 0.48 | — | — | Bal. | 0 | 2.1 | 13.1 | — | 3.5 | 13.2 |
| | | | | | | | | 30 | 1.8 | 15.2 | 43.5 | 3.0 | 15.5 |
| | | | | | | | | 50 | 4.5 | 17.0 | — | 10.5 | 7.1 |
| 6 | 0.32 | 0.36 | 0.11 | — | 0.85 | — | Bal. | 0 | 5.1 | 14.0 | — | 7.8 | 14.0 |
| | | | | | | | | 30 | 3.0 | 16.8 | 46.0 | 5.1 | 16.7 |
| | | | | | | | | 50 | 7.8 | 20.3 | — | 10.3 | 20.0 |
| 7 | 0.35 | 0.34 | 0.13 | — | — | 0.80 | Bal. | 0 | 5.5 | 14.3 | — | 6.6 | 14.4 |
| | | | | | | | | 30 | 3.2 | 17.1 | 45.0 | 4.5 | 17.1 |
| | | | | | | | | 50 | 8.5 | 20.8 | — | 9.8 | 20.7 |
| 8 | 0.31 | 0.34 | 0.13 | — | 0.78 | 0.56 | Bal. | 0 | 5.6 | 14.5 | — | 7.8 | 14.1 |
| | | | | | | | | 30 | 4.8 | 17.1 | 45.5 | 5.4 | 17.0 |
| | | | | | | | | 50 | 9.5 | 21.5 | — | 9.9 | 22.0 |

Each of the above-mentioned cast ingots of aluminum alloy having a length of 500 mm, a width of 200 mm and a thickness of 50 mm, was hot-rolled to a thickness of 8 mm, and then subjected to a primary cold rolling to prepare a primary cold-rolled sheet with a thickness of 1.6 mm. Then, after applying a primary annealing by holding at a temperature of 370° C. for two hours, the primary cold-rolled sheet was subjected to a secondary cold rolling to prepare a secondary cold-rolled sheet. And then, a sheet having a thickness of 0.16 mm was prepared by subjecting the secondary cold-rolled sheet to a secondary annealing, or by subjecting the secondary cold-rolled sheet to the secondary annealing followed by a final cold rolling at a reduction ratio of 30% or 50%. The sheets of the alloys of the present invention, the conventional alloys and the reference alloys, each having a thickness of 0.16 mm, were thus prepared.

Furthermore, a sheet of an Al—Si alloy containing 9.45 wt.% silicon with a thickness of 1 mm was laid, as a brazing metal, on the both surfaces of each of the above-mentioned hot-rolled sheets, each having a thickness of 8 mm. The assembly thus made was tack-welded by spot-welding the four corners of the both surfaces thereof, and then rolled under the same method as in the preparation of the aforementioned sheets. Clad sheets with a thickness of 0.16 mm of the alloys of the present invention, the conventional alloys and the reference alloys, each applied with the brazing metal, were thus prepared. In Tables 1 and 2, the reduction ratio represents that in the final cold rolling, and the reduction ratio of 0% refers to a case where the final cold rolling was not applied.

Subsequently, the following high-temperature sagging resistance test was carried out on the sheets and the clad sheets of the alloys of the present invention, the conventional alloys, and the reference alloys thus prepared.

More specifically, test pieces each having a length of 130 mm, a width of 22 mm and a thickness of 1.16 mm were cut respectively from the sheets and the clad sheets of the alloys of the present invention, the conventional alloys, and the reference alloys prepared as mentioned above. Each of the test pieces was horizontally fixed onto a stand made of stainless steel so that a portion of 30 mm of the length of the test piece protrudes from said stand. Then, the test piece was heated at a temperature of 620° C. for five minutes, and then, the downward sag value of said test piece was measured.

Results of the above-mentioned high-temperature sagging resistance test are shown in Tables 1 and 2, together with values of tensile strength and electric conductivity for evaluating thermal conductivity of these test pieces. Electric conductivity was measured on the sheets of the alloys of the present invention, the conventional alloys and the reference alloys, of which the cold rolling reduction ratio was 30%.

As is evident from the results of measurement shown in Tables 1 and 2, the alloys of the present invention Nos. 1 through 12 show a high-temperature sagging resistance and an electric conductivity superior to those of the conventional alloys Nos 1 through 3 in all cases of the sheets and the clad sheets.

As is clear from the comparison of the alloys of the present invention Nos. 1 through 4 with the reference alloys Nos. 1 through 4, the reference alloy No. 1 having a manganese content lower than the scope of the present invention shows an inferior high-temperature sagging resistance, and the reference alloy No. 2 having a manganese content higher than the scope of the present invention shows an inferior electric conductivity. The reference alloy No. 3 having a silicon content higher than the scope of the present invention and the reference alloy No. 4 having a zirconium content lower than the scope of the present invention show an inferior high-temperature sagging resistance.

The alloys of the present invention Nos. 5 and 6 having a chromium content within the scope of the present invention show an improved high-temperature sagging resistance as compared with the alloys of the present invention Nos. 1 through 4 not containing chromium. However, the reference alloy No. 5 having a chromium content higher than the scope of the present invention shows inferior high-temperature sagging resistance and inferior electric conductivity.

The alloys of the present invention Nos. 7 through 11 containing magnesium and/or copper within the scope of the present invention, and the alloy of the present invention No. 12 containing magnesium, copper and chromium within the scope of the present invention show a tensile strength superior to that of the alloys of the present invention Nos. 1 through 4 not containing these elements. However, the reference alloys Nos. 6 through 8 having magnesium and/or copper contents higher than the scope of the present invention are inferior both in high-temperature sagging resistance and in electric conductivity.

Since, as described above in detail, the aluminum alloy of the present invention is excellent both in high-temperature sagging resistance and in thermal conductivity, use thereof as a fin material for tubes which are the component members of a heat exchanger such as a radiator, a condenser or an evaporator provides the following industrially useful effects:

(1) Since the aluminum alloy of the present invention is excellent in high-temperature sagging resistance, even fins made thinner never sag down and deform at high temperatures when vacuum-brazing, thus eliminating irregularity in intervals between installed fins. It is therefore possible to uniformly and efficiently conduct cooling and heating, thus improving the performance of a heat exchanger, and the possibility of using thinner fins reduces the weight of the heat exchanger.

(2) Since the aluminum alloy of the present invention is excellent in thermal conductivity, it is possible to improve heat exchange property of a heat exchanger.

What is claimed is:

1. A clad sheet comprising (i) an aluminum alloy sheet having excellent high-temperature sagging resistance and thermal conductivity and (ii) at least one brazing metal film clad on at least one surface of said aluminum alloy sheet;

said aluminum alloy sheet consisting essentially of:
   manganese: from 0.1 to 0.5 wt.%,
   silicon: from 0.1 to 0.8 wt.%,
   zirconium: from 0.02 to 0.2 wt.%,
   and, the balance being aluminum and incidental impurities;

said aluminum alloy clad sheet being particularly adapted to be used as a fin material for tubes of a heat exchanger.

2. The clad sheet of claim 1, wherein said aluminum alloy sheet as claimed in claim 1, also contains from 0.05 to 0.4 wt.% chromium.

3. The clad sheet of claims 1 or 2, wherein said aluminum alloy sheet also contains at least one element selected from the group consisting of:
   magnesium: from 0.1 to 0.7 wt.%, and,
   copper: from 0.1 to 0.7 wt.%,
the total amount of said magnesium and said copper being up to 1.0 wt.%.

4. The clad sheet of claim 3, wherein said aluminum alloy sheet contains both magnesium and copper.

5. The clad sheet of claims 1 or 2, wherein said aluminum alloy sheet contains manganese in an amount between 0.15 and 0.5 weight percent; silicon in an amount between 0.24 and 0.57%; and zirconium in an amount between 0.05 and 0.18%.

6. The clad sheet of claim 1, wherein said aluminum alloy sheet contains manganese in an amount between 0.15 and 0.5 weight percent; silicon in an amount between 0.24 and 0.57%; zirconium in an amount between 0.05 and 0.18%; and chromium in an amount from 0.12 to 0.25%.

7. The clad sheet of claim 1, wherein said aluminum alloy sheet containing manganese in an amount between 0.15 and 0.5 weight percent; silicon in an amount between 0.24 and 0.57%; zirconium in an amount between 0.05 and 0.18%; chromium in an amount from 0.12 to 0.25%; and up to 1% of at least one element selected from the group consisting of mangesium in an amount from 0.16 to 0.66% and copper in an amount from 0.15% to 0.65%.

8. The clad sheet of claim 7, wherein said aluminum alloy sheet contains magnesium and copper.

* * * * *

UNITED STATES PATENT AND TRADEMARK OFFICE
CERTIFICATE OF CORRECTION

PATENT NO. : 4,511,632
DATED : April 16, 1985
INVENTOR(S) : Ken TOMA et al

It is certified that error appears in the above-identified patent and that said Letters Patent is hereby corrected as shown below:

COLUMNS 5 and 6, Table 1, in the right column, last row, headed "Tensile strength", the fourth value should be --10.2--; the seventh value should be --10.1--; the eighth value should be --12.8--; and the thirteenth value should be --12.3--;

COLUMNS 5 and 6, Table 1, in the right column, on the line corresponding to the seventh value of the "Tensile strength", rows 3, 4 and 5, respectively, the "Tensile strength" for the sheet should be --10.2--; the "Electric conductivity" should have no value; and the "Sag value" should be --1.0--.

Signed and Sealed this

Eighteenth Day of March 1986

[SEAL]

Attest:

DONALD J. QUIGG

Attesting Officer

Commissioner of Patents and Trademarks